US012271065B2

(12) United States Patent
Spyra et al.

(10) Patent No.: US 12,271,065 B2
(45) Date of Patent: Apr. 8, 2025

(54) INVERSE DESIGNED OPTICAL MODULATOR

(71) Applicant: X Development LLC, Mountain View, CA (US)

(72) Inventors: Aleksandra Spyra, Mountain View, CA (US); Ian Alexander Durant Williamson, Palo Alto, CA (US); Alfred Ka Chun Cheung, Belmont, CA (US)

(73) Assignee: X Development LLC, Mountain View, CA (US)

( * ) Notice: Subject to any disclaimer, the term of this patent is extended or adjusted under 35 U.S.C. 154(b) by 265 days.

(21) Appl. No.: 17/970,141

(22) Filed: Oct. 20, 2022

(65) Prior Publication Data

US 2024/0184148 A1    Jun. 6, 2024

(51) Int. Cl.
*G02B 6/122* (2006.01)
*G02F 1/00* (2006.01)
(Continued)

(52) U.S. Cl.
CPC ......... *G02F 1/0123* (2013.01); *G02B 6/1225* (2013.01); *G02F 1/0018* (2013.01);
(Continued)

(58) Field of Classification Search
CPC ........ G02B 6/1225; G02B 2006/12142; G02F 1/0018; G02F 1/01; G02F 1/0123; G02F 1/0136; G02F 1/0147; G02F 1/0151
See application file for complete search history.

(56) References Cited

U.S. PATENT DOCUMENTS

| 7,561,761 B2 * | 7/2009 | Sigalas | G02B 6/13 385/132 |
| 7,706,692 B2 | 4/2010 | Tatum et al. | |

(Continued)

FOREIGN PATENT DOCUMENTS

WO    2011142819 A2    11/2011

OTHER PUBLICATIONS

Lalau-Keraly et al., "Adjoint Shape Optimization Applied to Electromagnetic Design", Optical Society of America, 2013, 9 pages.
(Continued)

*Primary Examiner* — Ryan A Lepisto
(74) *Attorney, Agent, or Firm* — Christensen O'Connor Johnson Kindness PLLC

(57) ABSTRACT

An optical modulator includes a modulation region, an input port, an output port, and a modulation actuator. The modulation region includes an inhomogeneous arrangement of two or more different materials having different refractive indexes to structure the modulation region to manipulate one or more optical properties of an optical carrier wave in response to a modulation bias. The input port is optically coupled to the modulation region to inject the optical carrier wave into the modulation region. The modulation actuator is disposed proximate to the modulation region and adapted to apply the modulation bias to the modulation region to generate a modulated wave. The modulation bias adjusts at least one of the different refractive indexes of the inhomogeneous arrangement to provide variable control of the one or more optical properties of the optical carrier wave. The output port is optically coupled to the modulation region to receive the modulated wave.

19 Claims, 10 Drawing Sheets

(51) Int. Cl.
  *G02F 1/01* (2006.01)
  *G02F 1/015* (2006.01)
  *G02B 6/12* (2006.01)

(52) U.S. Cl.
  CPC .............. *G02F 1/01* (2013.01); *G02F 1/0136* (2013.01); *G02F 1/0151* (2021.01); *G02B 2006/12142* (2013.01); *G02F 1/0147* (2013.01)

(56) References Cited

U.S. PATENT DOCUMENTS

| | | | |
|---|---|---|---|
| 7,796,849 B2* | 9/2010 | Adibi | B82Y 20/00 398/79 |
| 8,849,071 B2 | 9/2014 | Kissa et al. | |
| 9,069,224 B2 | 6/2015 | Nishimoto et al. | |
| 9,519,104 B1* | 12/2016 | Mullen | G02B 6/1228 |
| 9,851,589 B2 | 12/2017 | Han et al. | |
| 9,952,456 B2 | 4/2018 | Huang | |
| 10,673,197 B2 | 6/2020 | Kliner et al. | |
| 10,862,610 B1* | 12/2020 | Schubert | H04B 10/25 |
| 11,187,854 B2* | 11/2021 | Schubert | G02B 6/12007 |
| 11,415,744 B1* | 8/2022 | Hammond | G02B 6/29346 |
| 11,494,461 B2* | 11/2022 | Engheta | G01B 9/02 |
| 11,500,218 B2* | 11/2022 | Zeng | G02B 6/125 |
| 11,501,053 B2* | 11/2022 | Adolf | G02B 6/2938 |
| 11,635,567 B1* | 4/2023 | Rodrigues | G02F 1/313 385/16 |
| 2004/0170351 A1 | 9/2004 | Fishman et al. | |
| 2010/0046879 A1 | 2/2010 | Lee et al. | |
| 2012/0155865 A1 | 6/2012 | Kawakami et al. | |
| 2018/0045953 A1 | 2/2018 | Fan et al. | |
| 2022/0019096 A1 | 1/2022 | Nomoto | |

OTHER PUBLICATIONS

Orondo et al., Response Linearization in Electro-Optic Modulators, Massachusetts Institute of Technology, 1997, 100 pages.
Reed et al., Silicon optical modulators, Materials Today, Jan. 2005, 11 pages.
Tu et al., Fabrication of low loss and high speed silicon optical modulator using doping compensation method, Optics Express, vol. 19, No. 19, Sep. 12, 2011, 7 pages.
U.S. Appl. No. 17/884,970, filed Aug. 10, 2022, 39 pages.
Wahab et al., Electromagnetic time reversal algorithms and source localization in lossy dielectric media, arXiv:1403.6463v2 [math-ph] Sep. 11, 2018, 20 pages.
International Searching Authority, International Search and Written Opinion mailed Jan. 18, 2024, in corresponding International Patent Application No. PCT/US2023/033361, 9 pages.

* cited by examiner $$Loss(T) = \sum_{x_i}(T_{OFF}(x_i) - f(x_i))^2 + (T_{ON}(x_i) - 1 + f(x_i))^2$$

INVERSE DESIGNED OPTICAL MODULATOR

TECHNICAL FIELD

This disclosure relates generally to photonic devices, and in particular, relates to optical modulators.

BACKGROUND INFORMATION

An optical modulator is an active component which allows a user to modulate an optical signal via an applied bias. This bias is typically achieved by changing voltage which electro-optically, thermo-optically, or mechano-optically tunes the refractive index of a material in some region of an integrated device. When the bias is modulated at high speed (e.g., gigahertz rates), information and data can be encoded and transmitted to a distant receiver.

Typical modulators are designed by humans using well understood components (e.g., combinations of waveguide-based phase shifters and directional couplers or modulated ring resonators). However, these conventional components have limits: they are large in footprint and have a limited number of "knobs" by which their performance can be improved and tweaked.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
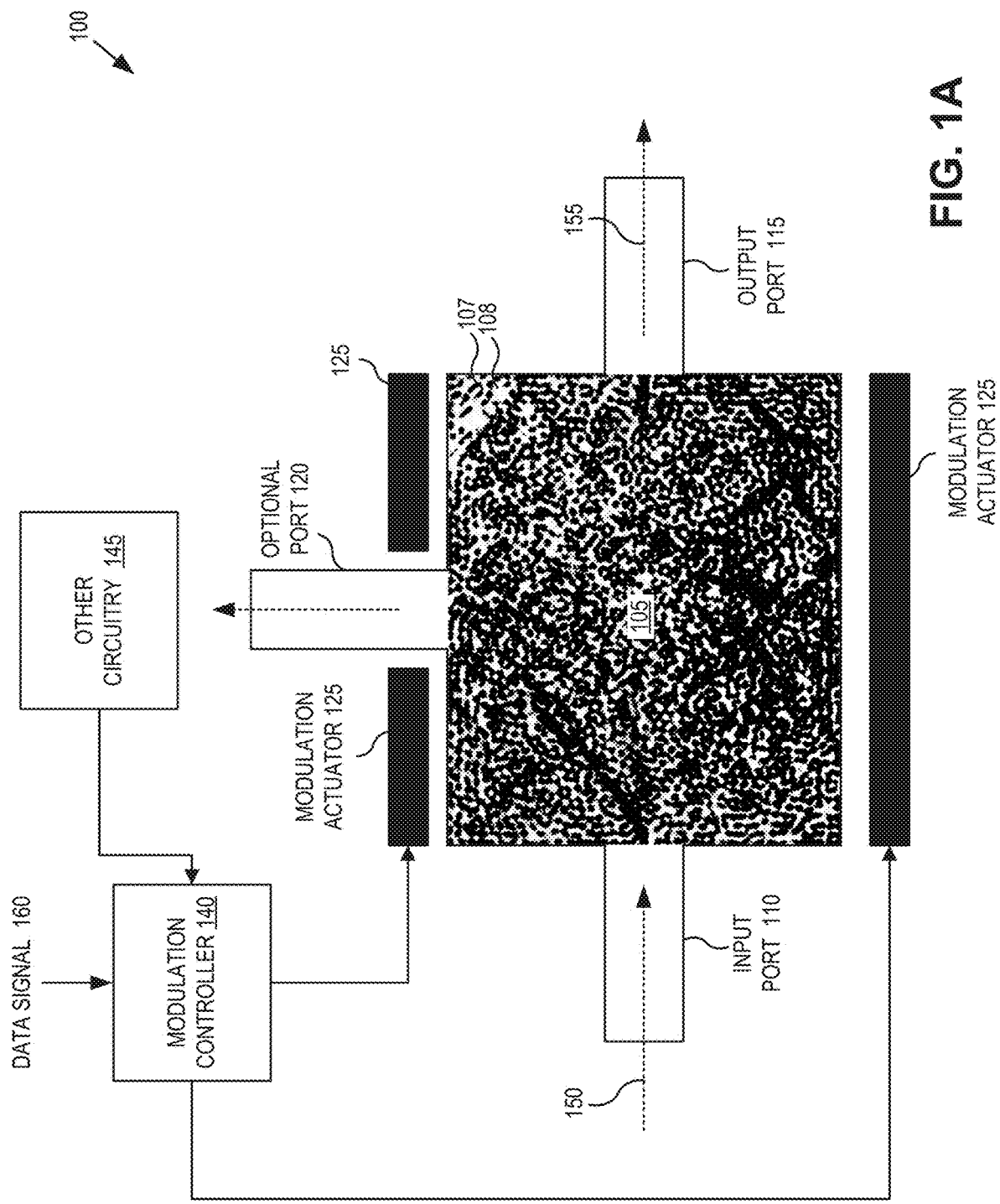
FIG. 1A illustrates an inverse designed optical modulator, in accordance with an embodiment of the disclosure.

Embodiments of a system, apparatus, method of operation, and method of design for an inverse designed optical modulator are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of an inverse designed optical modulator, which is a photonic device capable of manipulating one or more optical properties (e.g., frequency, phase, polarization, power, or combinations thereof) of an optical carrier wave (e.g., a waveform that may be modulated to convey information) by applying a modulation bias (e.g., voltage, pressure, or temperature) to the optical modulator. It is appreciated that embodiments of optical modulators described herein may be designed to overcome one or more bottlenecks of conventional optical modulators. For example, one significant performance bottleneck of a conventional optical modulator is due to the nonlinear relationship between the optical property being manipulated and the modulation bias applied. For example, there may be a nonlinear relationship when adjusting the bias (e.g., a voltage) to modulate a power (e.g., intensity or amplitude) of an optical carrier wave of a conventional optical modulator. Such a nonlinear relationship may be attributed to the material characteristics and/or components of the conventional optical modulator (e.g., a ring resonator, an optical power-splitter, or other optical component included in a photonic integrated circuit). The nonlinearity may create distortion in a transmitted signal and could limit the overall performance of the convention optical modulator (e.g., data rate). Additionally, it is appreciated that conventional optical modulators have limited parameters through which performance may be tuned. For example, a conventional optical modulator may correspond to an optical waveguide formed from lithium niobate, which has limited parameters through which the waveguide may be tuned or designed. Consequently, an approach to designing optical modulators with a greater number of parameters able to be tuned is necessary to design a high performance and compact device capable of compensating for bottlenecks of conventional optical modulators.

Embodiments described herein utilize an inverse design method to generate an optical modulator (e.g., for a photonic integrated circuit) capable of compensating or otherwise designing around bottlenecks of conventional optical modulators (e.g., nonlinearity in response, size, or otherwise). Specifically, a photonic device with a "modulation region" is designed, which has an inhomogeneous arrangement of two or more different materials having different refractive indexes to structure the modulation region to manipulate one or more optical properties of an optical carrier wave in response to a modulation bias. The modulation region is coupled to two or more ports (e.g., an input port and an output port) and a modulation actuator (e.g., to apply and/or adjust an applied voltage, current, temperature, and/or pressure to the modulation region) to form an optical modulator. To generate the design of the modulation region, an iterative inverse design approach is utilized with multiple bias points (e.g., different magnitudes of the bias applied by the modulation actuator and/or different changes in one or more of the refractive indexes of the inhomogeneous arrangement of the modulation region caused by the bias) applied to the optical modulator are simulated or otherwise considered in parallel to determine a design of the modulation region that form an optical modulator that meets target performance parameters. More specifically, an optimization objective (e.g., a loss function that results in an output to be minimized) that considers the multiple bias points is constructed. In some embodiments, the optimization objective may enforce a target response curve of the optical modulator (e.g., monotonic, linear, or nonlinear), which may compensate for bottlenecks that are present in traditionally designed optical modulators.

FIG. 1 illustrates an inverse designed optical modulator 100, in accordance with an embodiment of the disclosure. The illustrated embodiment of optical modulator 100 includes a modulation region 105, an input port 110, an output port 115, optional port 120, a modulation actuator 125, a modulation controller 140, and other circuitry 145. The illustrated embodiment of the modulation region 105 includes an inhomogeneous arrangement of two or more different materials (e.g., first material 107 and second material 108) having different refractive indexes to structure the modulation region 105 to manipulate one or more optical properties (e.g., frequency, phase, polarization, power, or combinations thereof) of optical carrier wave 150 in response to a modulation bias (e.g., adjustable voltage, current, pressure, or temperature) applied to the modulation region 105. The input port 110 is optically coupled to the modulation region 105 to inject the optical carrier wave 150 into the modulation region 105. The modulation actuator 125 is disposed proximate to the modulation region 105 and adapted to apply the modulation bias to the modulation region 105 to generate a modulated wave 155 (e.g., to convey information, correct for distortion, or the like). The output port 115 is optically coupled to the modulation region 105 to receive the modulated wave 155. In some embodiments, the inverse designed optical modulator 100 optional port 120. It is appreciated that while only one of optional port 120 is illustrated, in some embodiments there may be more than one optional port 120. However, in other embodiments, the inverse designed optical modulator 100 may not include optional port 120 (e.g., no other ports are directly coupled to the modulation region 105 but for the input port 110 and the output port 115).

Modulation region 105 may also be referred to as the "design region" or "active region" of the optical modulator 100, which is where the modulation bias (e.g., applied voltage, current, temperature, pressure) is capable of variably adjusting at least one of the different refractive indexes included in the inhomogeneous arrangement of the two or more different materials. For example, the two or more different materials may include the first material 107 and the second material 108, each with a respective refractive index that may change in response to the modulation bias being applied to modulation region 105. The degree of which at least one of the different refractive indexes changes is based, at least in part, on a magnitude of the modulation bias and the material properties of at least one of the two or more different materials (e.g., electro-optic coefficient of the first material 107 or the second material 108). In the illustrated embodiment, the modulation region 105 is structured as an optical cavity (e.g., a resonant cavity) and the inhomogeneous arrangement of the first material 107 and the second material 108 results in a material interface pattern that provides, in response to the modulation bias, the intended functionality for the optical modulator 100. It is appreciated that the response to the modulation bias may also include when the magnitude of the modulation bias is zero or a reference value (e.g., when the modulation bias corresponds to an applied voltage, then a magnitude of zero for the modulation bias may correspond to 0 V or ground, when the modulation bias corresponds to an applied pressure or temperature, a zero or reference value magnitude for the modulation bias may correspond to ambient pressure or temperature, and so forth).

In some embodiments, the pattern of discrete regions of the first material 107 and the second material 108 operate to selectively steer (e.g., via refraction, scattering, reflection, dispersion, or otherwise) the inbound optical carrier wave 150 received via input port 110 to either output port 115 or optional port 120 under the influence of modulation actuator 125 (e.g., to implement an ON-OFF keying modulation scheme where optical power is either primarily directed to output port 115 during an ON or HIGH logic state, or primarily directed to optional port 120 during an OFF or LOW logic state of the modulated wave 155). In other words, the modulated 155 wave comprises a plurality of states, each based on a magnitude of the modulation bias and the plurality of states include a high state and a low state. In some embodiments, the inhomogeneous arrangement of first material 107 and second material 108 is structured to steer, scatter, or reflect a portion of the optical carrier wave 150 (e.g., in terms of optical power) away from output port 115 when the modulated wave 155 is modulated to the low state or an intermediary state between the high and low states. In some embodiments, the portion of the optical carrier wave 150 steered away from the output part 115 is directed towards optional port 120. In other embodiments, an ON-OFF keying modulation scheme may be implemented by modulating other aspects of the one or more optical properties of the optical carrier wave 150 (e.g., other than power or amplitude such as frequency, phase, polarization, or combinations thereof). In the same or other embodiments, the optical modulator 100 may be used to correct for distortion or otherwise provide active and/or variable manipulation of the one or more optical properties of the optical carrier wave 150 to generate the modulated wave 155. For example, distortion in the optical carrier wave 150 may be corrected or compensated for by adjusting frequency, phase, polarization, or power of the optical carrier wave 150. In such an embodiment, it becomes particularly important that the response curve of the optical modulator is known to provide variable control over the one or more optical properties of the optical carrier wave 150 since distortion is not necessarily fixed. By tailoring the response curve in a certain manner (e.g., linear, nonlinear, monotonic, or otherwise), it becomes possible to tune the one or more optical properties of the optical carrier wave 150 in a targeted and reliable manner. It is appreciated that the ON-OFF keying modulation, distortion correction, or other schemes may be implemented by adapting the modulation actuator 125 to impart data signal 160 onto optical carrier wave 150 to generate modulated wave 155 via the modulation bias.

In some embodiments, other circuitry 145 may include a photoreceiver (e.g., a photoelectric or photovoltaic device, such as a photodiode, photocell, or otherwise) and/or power regulator circuitry (e.g., a rectifier such as a diode, a storage capacitor, and/or other conventional regulation circuitry) to receive a portion of the optical carrier wave 150 (e.g., when the modulated wave 155 is modulated to state other than a high or on logic state), which may be utilized to recover rejected optical power and convert the recovered optical power into electrical power (e.g., to power modulation controller 140).

Referring back to modulation region 105, first material 107 and second material 108 are discrete regions of material with different refractive indexes, which refractive indexes change in response to a bias (e.g., applied voltage, current, temperature, pressure). In one embodiment, first material 107 and second material 108 may be a waveguiding core material and a waveguiding cladding material, respectively. This core and cladding material may be the same core and cladding material used to form the waveguide sections of input port 110, output port 115, and/or optional port 120. For example, first material 107 may be a semiconductor material (e.g., silicon, III-V semiconductor material, II-VI semiconductor material, lithium niobate, or other semiconductor material) while second material 108 may be an oxide material (e.g., silicon dioxide). In yet other embodiments, first material 107 and second material 108 may be implemented as discrete regions of intrinsic silicon and doped silicon, discrete regions of differently doped silicon, or may be combinations of other types of semiconductor material (e.g., III-V semiconductor material, II-VI semiconductor material, lithium niobate, combinations thereof, or the like). In one embodiment, modulation region 105 is approximately 1.5 μm by 1.2 μm while ports 110, 115, and 120 are waveguide sections having a 200 nm width and a 600 nm length. The discrete regions of first material 107 and second material 108 may be implemented as conglomerations of each material type in incremental pixel or voxel sizes of 5 nm×5 nm. In other words, the inhomogeneous arrangement of the first material 107 and the second material 108 may be reproducible by a schematic defined by a plurality of pixels or voxels having an area of 5 nm×5 nm. Of course, other pixel or voxel resolutions may be implemented (e.g., area greater than 5 nm×5 nm or less than 5 nm×5 nm, different size pixels or voxels, uniform pixel or voxel size, non-uniform pixel or voxel size, or other configurations).

Modulation is achieved via a modulation bias that is applied to modulation region 105 via modulation actuator 125, which in turn is driven by modulation controller 140 (e.g., a microcontroller, application specific integrated circuit, field-programmable gate array, or other configurable controller coupled to or including memory) in response to data signal 160. Accordingly, modulation controller 140 may include modulation/demodulation circuitry along with driver circuitry to drive modulation actuator 125. The modulation actuator 125 may be implemented using a number of techniques to apply an adjustable electric field, temperature, or pressure to the modulation region 105. In one embodiment, modulation actuator 125 includes electrodes surrounding sides of modulation region 105 and the modulation bias is an applied voltage and/or injected current. In another embodiment, modulation actuator 125 includes one or more heating elements surrounding modulation region 105 and the modulation bias is an adjustable temperature. In yet another embodiment, modulation actuator 125 includes an electromechanical actuator (e.g., piezoelectric crystal, microelectromechanical systems, etc.) surrounding modulation region 105 and the modulation bias is an adjustable pressure. Each of these modulation biases serve to adjust at least one of the different refractive indexes of the inhomogeneous arrangement (e.g., of first material 107 and/or second material 108) to provide variable control of the one or more optical properties of the optical carrier wave 150. Specifically, the change in refractive indexes of the inhomogeneous arrangement changes how the optical carrier wave of at least one of the first material 107 or the second material 108 which in turn affects the scattering, refraction, reflective, and/or dispersion of optical carrier wave 150 within the modulation region 101 to form modulated wave 155. It is further appreciated that the modulation actuator 125 may surround the modulation region 105 in various ways. For example, if FIG. 1A is a top-view of the modulation region 105, then an electrode of the modulation actuator 125 may lie along a common plane with the modulation region 105. In the same or other embodiments, the modulation region 105 may be sandwiched between two or more electrodes (see, e.g., FIGS. 1C-1E).

Figure 1B:
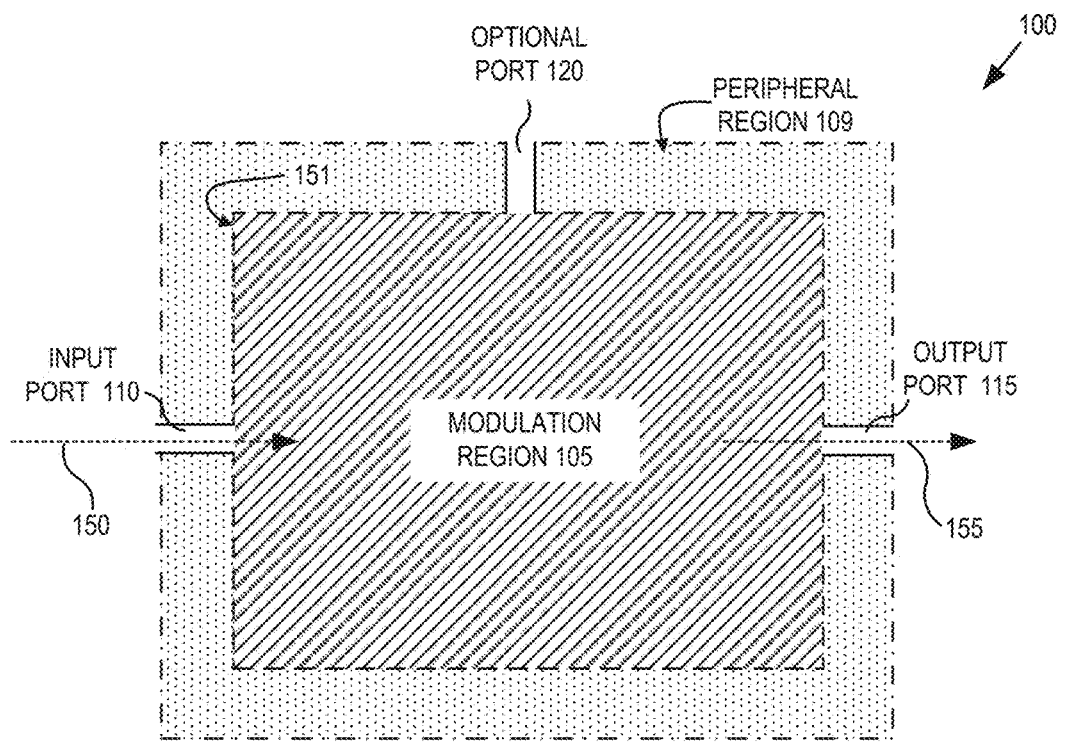
FIG. 1B illustrates a top-view of a portion of the inverse designed optical modulator of FIG. 1A, in accordance with an embodiment of the disclosure.

FIG. 1B illustrates a top-view of a portion of the inverse designed optical modulator of FIG. 1A, in accordance with an embodiment of the disclosure. In the illustrated embodiment, input port 110, output port 115, and optional port 120 are each adjacent to modulation region 105 and operate as optical inputs or outputs for propagating waves. Although input port 110, output port 115, and optional port 120 are referred to as "ports", these ports may include longitudinal length in the direction of light propagation. As such, input port 110, output port 115, and optional port 120 may be implemented as waveguide sections having a core and cladding with one end physically abutting, or otherwise optically coupled to, modulation region 105. In various embodiments, input port 110, output port 115, optional port 120, and modulation region 105 are all planar waveguide sections. These planar waveguide sections may be embedded within a semiconductor material such as a silicon-on-insulator (SOI) system, a photonic integrated circuit (PIC), or otherwise. In some embodiments, the core and cladding material may correspond to silicon and silicon dioxide of the input port 110, output port 115, and optional port 120. In the same or other embodiments, the core and cladding material may correspond to first material 107 and second material 108 of the modulation region 105. In yet other embodiments, the core and cladding material of input port 110, output port 115, optional port 120 may be different than first material 107 and/or second material 108.

It is appreciated that the design of the optical modulator 100 is non-limiting. Rather, in some embodiments, the number of (or presence) of optional port 120 may be configured based on the intended functionality of the optical modulator 100. Specifically, depending on which of the one or more optical properties of the optical carrier wave 150 are to be modulated by the modulation region 105 in response to the modulation bias, the configuration of the optical modulator 100 may change. For example, if the optical modulator 100 is a polarization or phase modulator of the optical carrier wave 150, then it may not be necessary to include optional port 120 since it may not be necessary to divert a portion of the optical carrier wave 150 away from the output port 115. However, in other scenarios, it may be advantageous to configure the optical modulator 100 to include the one or more of optional port 120. For example, if the optical modulator is a power or amplitude modulator of the optical carrier wave 150, then optional port 120 may correspond to or otherwise include a sink port to receive a portion of the optical power of the optical carrier wave 150 (e.g., when then modulated wave 155 is in a state other than a HIGH or ON state such as an OFF or LOW state or an intermediary state between HIGH and LOW). Of course, it is appreciated that even if the optical modulator 100 is adapted to modulate a power or amplitude of the optical carrier wave 150, in certain embodiments the optical modulator 100 may still not include optional port 120 (e.g., the modulation region 105 may direct a portion of the optical carrier wave 150 away from the output port 115 such that it is reflected back to the input port 110, scattered outside the modulation region 105, or otherwise not included in the modulated wave 155 when the modulated wave 155 is in a state other than HIGH or ON).

In the illustrated embodiment, the modulation region 105 is a substantially planar structure with input port 110, output port 115, and optional port 120 each in plane with, but abutting different sides of, modulation region 115. In other embodiments, each of input port 110, output port 115, and optional port 120 may abut a common side of modulation region 105. In yet another embodiment, only two selected from a group including input port 110, output port 115, and optional port 120 may abut a common side of modulation region 105 while the unselected port included in the group may abut a side of the modulation region 105 adjacent to or opposite of the common side. As mentioned previously, it is appreciated that option port 120 is not limited to an individual port, and that in some embodiments, optional port 120 may include multiple ports that may be arranged variously around modulation region 120. Additionally, it is appreciated that in the illustrated embodiment, modulation region 120 is laterally surrounded by a peripheral region 109, which may have a homogeneous composition (e.g., corresponding to two one of the different materials that form modulation region 105 such as first material 107, second material 108, or any other material) which forms a material interface boundary 151 that continuously and contiguously extend laterally around modulation region 105 but for where input port 110, output port 115, and optional port 120 interface or otherwise abut modulation region 105. In some embodiments, the homogeneous composition of peripheral region 109 corresponds to silicon dioxide. It is appreciated that material interface boundary 151 may correspond to where there is change in refractive index due to different materials interfacing and collectively form boundaries of an optical cavity (e.g., to help mitigate optical carrier wave 150 from leaving modulation region 105 through regions other than ports 110, 115, and/or 120). It is appreciated that the material interface boundaries (e.g., material interface boundary 151 and/or material interface boundaries formed by discrete regions formed by first material 107 and second material 108) define, at least in part, functionality of the optical modulator 100.

Figure 1C:
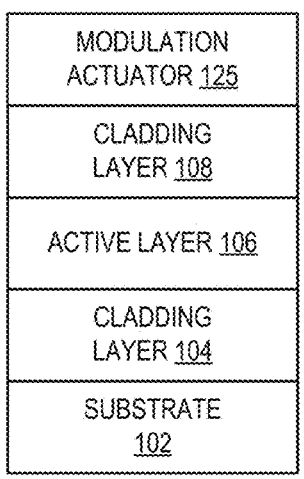
FIGS. 1C-1E illustrate cross-sectional views of a portion of the inverse designed optical modulator of FIG. 1A, in accordance with an embodiment of the disclosure.
Figure 1D:
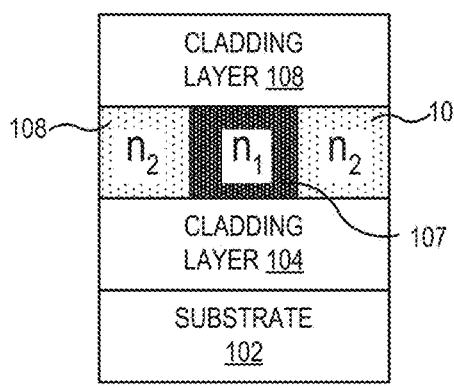
Figure 1E:
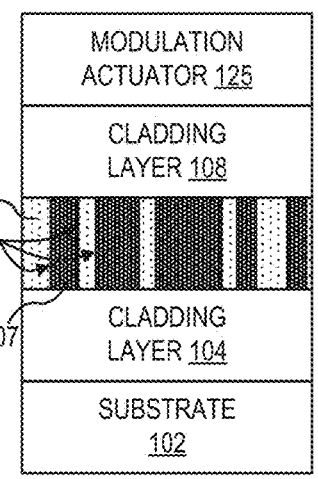

FIGS. 1C-1E illustrate cross-sectional views of a portion of the inverse designed optical modulator of FIG. 1A, in accordance with an embodiment of the disclosure. More specifically, FIGS. 1C-1E illustrate a vertical schematic or stack of various layers that may be included in the optical modulator 100 illustrated in FIG. 1A. However, it is appreciated that the illustrated embodiment is not exhaustive and that certain features or elements may be omitted to avoid obscuring certain aspects of the invention. As illustrated in FIG. 1C, optical modulator 100 includes substrate 102, cladding layer 104, active layer 106, cladding layer 108, and modulation actuator 125. In some embodiments, optical modulator 100 may be, in part or otherwise, a photonic integrated circuit or silicon photonic device that is compatible with conventional fabrication techniques (e.g., lithographic techniques such as photolithography, electron-beam lithography and the like, sputtering, thermal evaporation, physical and chemical vapor deposition, and the like).

In one embodiment a silicon on insulator (SOI) wafer may be initially provided that includes a support substrate (e.g., a silicon substrate) that corresponds to substrate 102, a silicon dioxide dielectric layer that corresponds to cladding layer 104, a silicon layer (e.g., intrinsic, doped, or otherwise), and an oxide layer (e.g., intrinsic, grown, or otherwise). In one embodiment, the silicon in active layer 106 may be etched selectively by lithography to create a pattern on the SOI wafer that is transferred to SOI wafer via a dry etch process (e.g., via a photoresist mask or other hard mask) to remove portions of the silicon. The silicon may be etched all the way down to cladding layer 104 to form voids that may subsequently be backfilled with silicon dioxide that is subsequently encapsulated with silicon dioxide to form cladding layer 108. In one embodiment, there may be several etch depths including a full etch depth of the silicon to obtain the targeted structure. In one embodiment, the silicon may be 220 nm thick and thus the full etch depth may be 220 nm. In some embodiments, this may be a two-step encapsulation process in which two silicon dioxide depositions are performed with an intermediate chemical mechanical planarization used to yield a planar surface.

FIG. 1D illustrates a more detailed view of a portion of active layer 106 (relative to FIG. 1C) taken along a portion of peripheral region 109 that includes either input port 110, output port 115 or optional port 120. More specifically, the portion of the active layer 106 illustrated in FIG. 1D, may correspond to a waveguide section of one of input port 110, output port 115 or optional port 120. In the illustrated embodiment, active layer 106 includes first material 107 with a refractive index of $n_1$ and second material 108 with a refractive index of $n_2$ that is different from $n_1$. Homogeneous and contiguous regions of first material 107 and second material 108 may form waveguides or portions of waveguides that correspond to input port 110, output port 115, or optional port 120 illustrated in FIGS. 1A-1B. In some embodiments, cladding layers 104 and 108 may have a homogeneous composition corresponding to second material 108 (e.g., silicon dioxide). It is noted that the illustrated embodiment of FIG. 1D, does not show modulation actuator 125 since the illustrated cross-section extends through one of input port 110, output port 115 or optional port 120 and it may not be necessary to apply the modulation bias to the input port 110, output port 115 or optional port 120.

FIG. 1E illustrates a more detailed view of active layer 106 (relative to FIG. 1C) taken along modulation region 105 illustrated in FIGS. 1A and 1B. As described previously, modulation region 105 includes first material 107 (e.g., silicon) and a second material 108 (e.g., silicon dioxide), which are discrete regions of a homogeneous compositions that are inhomogeneously interspersed to form a plurality of interfaces 111 that collectively form a material interface pattern. Each of the plurality of interfaces 111 that form the interface pattern correspond to a change in refractive index which the modulation region 105 to collectively structure the modulation region 105 (i.e., based on the shape and arrangement of first material 107 and second material 108) in combination with the modulation bias to provide, at least in part, the functionality of the optical modulator 100 (i.e., manipulation of one or more optical properties of an optical carrier wave to generate a modulated wave).

As illustrated, active layer 106 is disposed between cladding layer 104 and cladding layer 108, which in turn are disposed between substrate 102 and modulation actuator 125. In some embodiments, modulation actuator 125 may correspond to an electrode while substrate 102 may correspond to a counter-electrode. In some embodiments, an adjustable bias (e.g., voltage) may be applied between modulation actuator 125 and substrate 102 to generate a bias across modulation region 105. It is appreciated that in other embodiments, temperature or pressure may be applied to modulation region 105 via modulation actuator 125. Additionally, it is appreciated that in some embodiments, cladding layer 104 and/or cladding layer 108 may be omitted.

It is appreciated that in the illustrated embodiments of optical modulator 100 as shown in FIGS. 1C-1E, the change in refractive index is shown as being vertically consistent (i.e., first material 107 and second material 108 form interfaces that are substantially vertical or perpendicular to a lateral plane or cross-section of optical modulator 100. However, in the same or other embodiments, the plurality of interfaces (e.g., interfaces 111 illustrated in FIG. 1E) may not be substantially perpendicular with the lateral plane or cross-section of optical modulator 100.

Figure 1F:
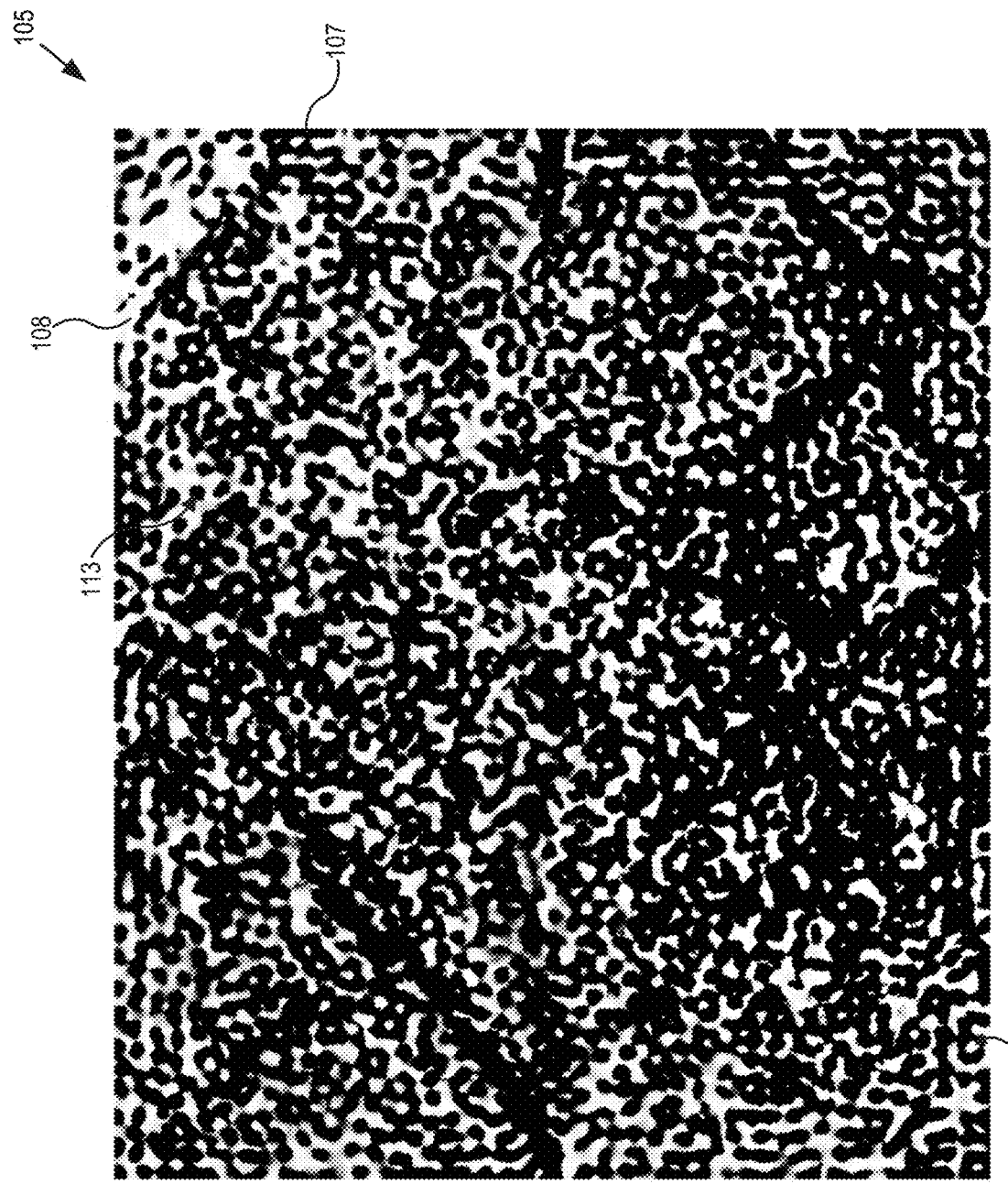
FIG. 1F illustrates a more detailed view of an example modulation region for the inverse designed optical modulator of FIG. 1A, in accordance with an embodiment of the disclosure.

FIG. 1F illustrates a more detailed view of modulation region 105 for the inverse designed optical modulator of FIG. 1A, in accordance with an embodiment of the disclosure. As illustrated, modulation region 105 includes an inhomogeneous arrangement of two or more different materials (e.g., first material 107 and second material 108) having different refractive indexes to structure modulation region 105 to manipulate one or more optical properties of an optical carrier wave in response to a modulation bias. In some embodiments, first material 107 and second material 108 respectively correspond to silicon and silicon dioxide. However, as discussed in embodiments of the disclosure, first material 107 and second material 108 may be different materials than silicon or silicon dioxide (e.g., first material 107 or second material 108 may correspond to lithium niobate, III-V semiconductor materials, II-VI semiconductor materials, different doped regions of silicon, or combinations thereof). In the illustrated embodiment, discrete regions of first material 107 and second material 108 may form one or more islands of a given material included in modulation region 105. For example, the inhomogeneous arrangement of first material 107 and second material 108 may include first island 113 of first material 107 laterally surrounded by second material 108 and second island 114 of second material 108 laterally surrounded by first material 107. It is appreciated that the inhomogeneous arrangement of first material 107 and second material 108 form a pattern that is determined based upon an iterative minimization of a loss function (see, e.g., loss function 205 illustrated in FIG. 2A).

Figures 2A, 2B:
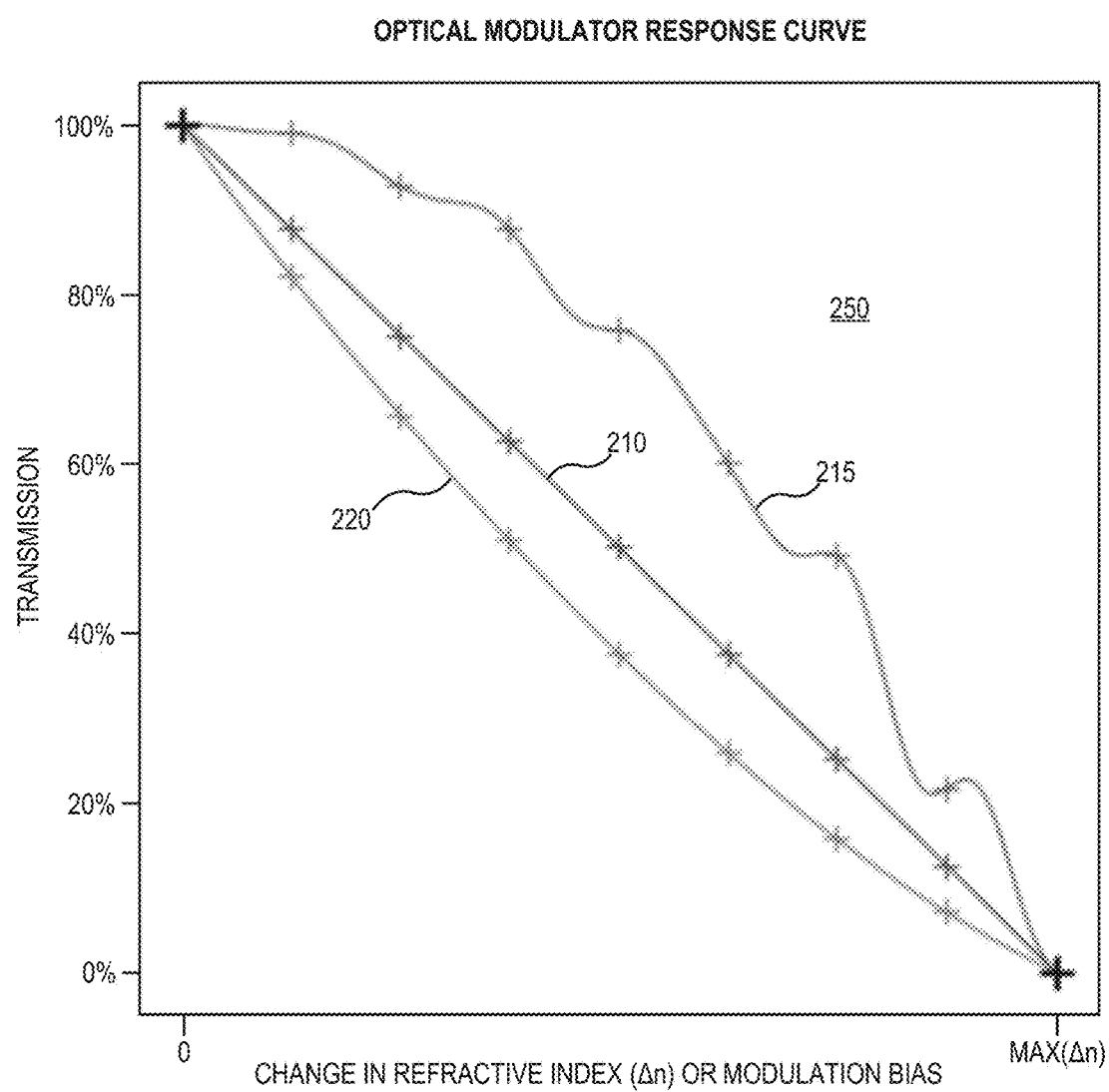
FIG. 2A illustrates a loss function for inverse design of an optical modulator, in accordance with an embodiment of the disclosure.
FIG. 2B illustrates an example optical modulator response curve for an inverse designed optical modulator, in accordance with an embodiment of the disclosure.

FIG. 2A illustrates a loss function 205 for inverse design of an optical modulator, in accordance with an embodiment of the disclosure. Loss function 205 is one example loss function that may be utilized as an objective function for generating a design or schematic of modulation region 105 illustrated in FIG. 1A and FIG. 1B. However, it is appreciated that in other embodiments a different or more robust loss function may be utilized in place of loss function 205.

As discussed previously, the inhomogeneous arrangement comprises discrete patterns of two or more different materials (e.g., first material 107 and second material 108) with the pattern selected based upon an iterative minimization of a loss function (or more specifically minimization of the output of said loss function) that incorporates a plurality of different states of the optical modulator 100, each associated with a different refractive index change. By incorporating multiple states that each represent a different change in the refractive index (e.g., based on a magnitude of a modulation bias applied to the modulation region 105), the response curve of the optical modulator 100 can be tailored to perform in a pre-determined way (e.g., monotonic, and linear or nonlinear). Advantageously, fine tuning how the optical modulator performs may compensate for drawbacks in conventional optical modulators or otherwise enable an optical modulator with improved control over one or more optical properties. Inverse design techniques may consider the layout of an optical modulator, such as optical modulator 100, constructed with input port 110, modulation (design) region 105, output port 115, and optional port 120. Multiple bias points of the optical modulator are simulated in parallel by constructing device geometries or patterns of first material 107 and second material 108 using the same overall topology but with different perturbations to the refractive index in at least one of first material 107 or second material 108. These parallel simulations thus calculate the optical transmission in the illustrated embodiment from input port 110 to output port 115 as a function of the refractive index perturbation or change ($\Delta n$) or a magnitude of the modulation bias itself. It is appreciated that while transmission, T, is utilized in embodiments of loss function 205 illustrated in FIG. 2A, other properties of an optical carrier wave may also be determined in addition to or in place of transmission (e.g., polarization phase, frequency, etc.).

An optimization objective of the inverse design methodology is constructed as one or more optical properties of an optical carrier wave (e.g., power, polarization, phase, frequency, or combinations thereof). In the illustrated embodiment, loss function 205 is configured for transmission or optical power of an optical carrier wave function of this transmission. The loss metric (e.g., Loss(T)), corresponds to a summation of points of interest, $x_i$, where each point of interest corresponds to one of the plurality of states of the optical modulator (e.g., different values for the change of refractive index up to a max change in refractive index resultant from different magnitudes of the modulation bias). Each of the points of interest, may thus correspond be included in the parallel computation or simulations of the optical modulator 100 based on a common topology or inhomogeneous arrangement of the first material 107 and the second material 108. For each point of interest in the summation, the loss function is represented as the sum of two squares (e.g., $T_{ON}(x_i)-f(x_i)$ and $T_{OFF}(x_i)-1+f(x_i)$, but in other embodiments a different sum may be used. The function, $f$, may be utilized to tailor or otherwise enforce a desired response curve for the optical modulator 100 when optimizing the design. Additionally, it is appreciated that in some embodiments, a penalty may be utilized to enforce certain criteria (e.g., prioritize performance for maximum and minimum values for the change in refractive index or modulation bias such that the ON and OFF logic states of the optical modulator are prioritized over any intermediary logic states disposed between the ON or OFF logic states).

Inverse design operates using a design simulator (e.g., a design model) configured with an initial design or pattern for modulation region 105 to perform a forward operational simulation of the initial design (e.g., using Maxwell's equations for electromagnetics). The output of the forward operational simulation is a simulated field response at output port 115 and (optionally) optional port 120. Specific performance parameters of this output field response may be selected as parameters of interest (e.g., power loss, wavelength, etc.) and are referred to as simulated performance parameters. The simulated performance parameters are used by loss function 205 to calculate a performance loss value or metric, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error (e.g., loss gradients) is backpropagated through the design model during the adjoint simulation to generate a structural design error at input port 110. Backpropagation of the performance loss error facilitates the computation of additional performance gradients, such as structural gradients that represent the sensitivity of the performance loss value to changes in the structural material properties (e.g., topology or pattern of first material 107 and second material 108) of modulation region 105. These gradients are output as a structural design error, which may then be used by a structural optimizer to perform an iterative gradient descent (e.g., stochastic gradient descent) that optimizes or refines the initial structural design to generate a revised structural design of modulation region 105. The forward and reverse simulations may then be iterated until the performance loss value falls within acceptable design criteria (referred to as saturation). The above description is merely an example inverse design technique that may be used to refine or optimize the features and topology of optical modulator 100. It is appreciated that other inverse design techniques alone, or in combination with other conventional design techniques, may also be implemented. Accordingly, the inverse design techniques described above may be applied to determine the specific material combinations, feature sizes, and feature arrangement (i.e., pattern) to achieve the desired performance at each port for a given logic state of optical modulator 100 using loss function 205.

FIG. 2B illustrates example chart 250 for optical modulator response curves 210, 215, and 220 for example inverse designed optical modulators, in accordance with an embodiment of the disclosure. It is appreciated that response curves 210, 215, or 220 may be representative of the optical modulator 100 illustrated in FIGS. 1A-1F. In the illustrated embodiment, the y-axis corresponds to transmission at output port 115 with respect to a change in refractive index (e.g., Δn) or magnitude of modulation bias (e.g., change in voltage, current, pressure, or temperature applied to the modulation region 105). It is appreciated that the function, $f$, of the loss function 205 may incorporate the change in refractive index and/or modulation bias as a metric for determining or otherwise simulating the performance of the optical modulator 100 at each point of interest (e.g., transmission at the output port 115 as illustrated in FIG. 2A, or any other one of, or combination of the one or more optical properties of the optical carrier wave 150 as discussed in embodiments of the disclosure). It is appreciated that each point marked as "+" within the chart 250 corresponds to one of the points of interest included in $x_i$ of the loss function 205 illustrated in FIG. 2A. However, it is appreciated that more or less points of interest may be utilized depending on the targeting granularity desired when designing optical modulator 100.

In the illustrated embodiments, the chart 250 shows three example response curves 210, 215, and 220 representing embodiments of the optical modulator 100 illustrated in FIGS. 1A-1E. In some embodiments, the inhomogeneous arrangement of the first material 107 and the second material 108 is structured such that a response curve for the optical modulator 100 of a change in the one or more optical properties of the optical carrier wave with respect to a change in a magnitude of modulation bias or a change in the different refractive indexes due to the modulation bias is linear as illustrated by response curve 210. In other embodiments, the inhomogeneous arrangement of the first material 107 and the second material 108 is structured such that a response curve for the optical modulator 100 of a change in the one or more optical properties of the optical carrier wave with respect to a change in the different refractive indexes due to the modulation bias is nonlinear as illustrated by response curve 215 and 220. It is appreciated that the response curves 210 and 220 are monotonic (e.g., a non-increasing or non-decreasing response curves). Specifically, when considered from the zero change value to max change in value for the x-axis of chart 250, response curves 210 and 220 are non-increasing response curves.

Figure 3:
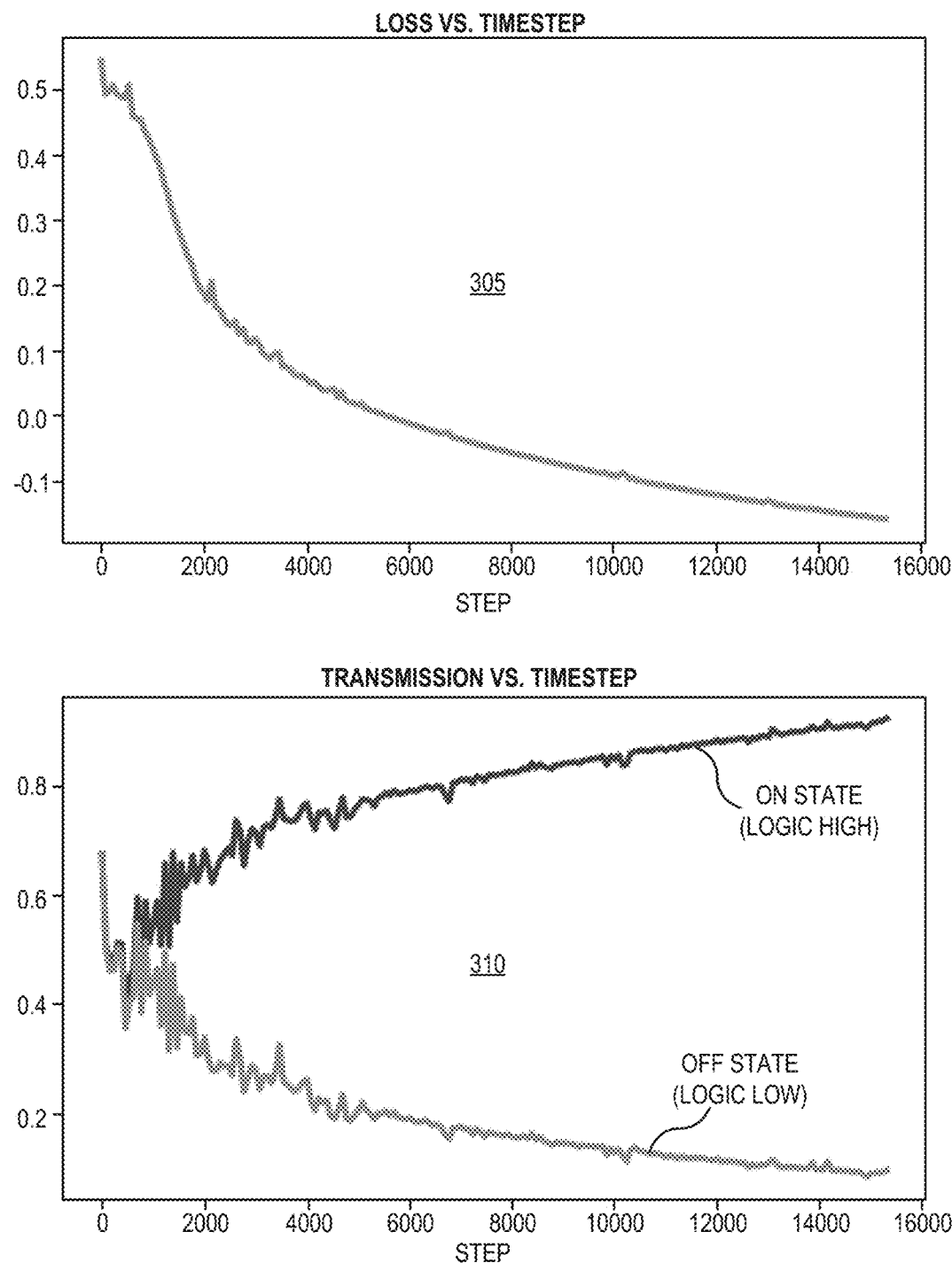
FIG. 3 illustrates charts showing an iterative process by which the modulation region is optimized to reduce a loss metric, in accordance with an embodiment of the disclosure.

FIG. 3 includes charts illustrating the iterative inverse design of modulation region 105 using loss function 205, in accordance with an embodiment of the disclosure. Chart 305 illustrates how loss function 205 saturates to a minimum value after a certain number of time steps of doing iterative forward and adjoint simulations. Chart 310 illustrates how the transmission power T at output port 115 changes for the on state (e.g., logic high) and off state (e.g., logic low) of the optical modulator 100 as the iterative design of the modulation region 105 progresses.

Figure 4:
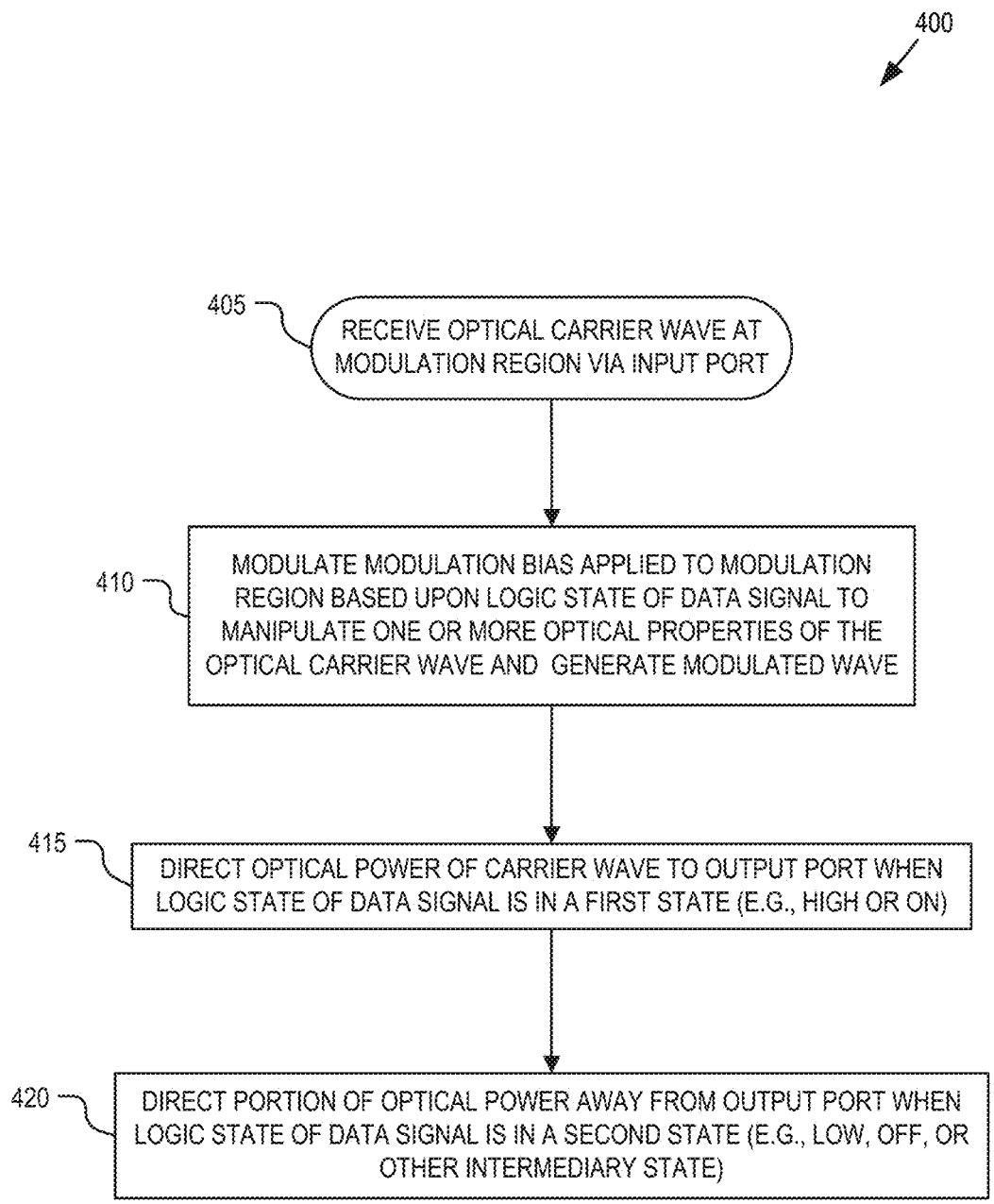
FIG. 4 illustrates a flow chart detailing example operation for an inverse designed optical modulator, in accordance with an embodiment of the disclosure.

FIG. 4 is a flow chart illustrating a process 400 of operation of optical modulator 100, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, optical carrier wave 150 is received by modulation region 105 via input port 110 optically coupled to the modulation region 105. The modulation region 105 includes an inhomogeneous arrangement of two or more different materials (e.g., first material 107 and second material 108) having different refractive indexes to structure the modulation region 105 to manipulate one or more optical properties (e.g., phase, polarization, power, frequency, or combinations thereof) of optical carrier wave 150 in response to a modulation bias. Optical carrier wave 150 may be a continuous wave generated by a laser source (e.g., laser diode, etc.) guided into input port 110 along a single mode waveguide (e.g., planar waveguide, fiber optic, etc.). The laser source may be an on-chip device integrated into a PIC with optical modulator 100, or a distinct off-chip device of which its output is guided to input port 110. In other embodiments, optical carrier wave 150 may already have a data signal embedded thereon (e.g., when correcting for distortion, the optical carrier wave 150 may already be conveying information).

In a process block 410, optical carrier wave 150 is modulated within modulation region 105 in response to a modulation bias applied by modulation actuator 125. Specifically, the modulation bias is modulated to generate modulated wave 155, which is directed towards output port 115 optically coupled to modulation region 105. The modulation bias adjusts at least one of the different refractive indexes of the inhomogeneous arrangement to provide variable control of one or more optical properties of optical carrier wave 150. Modulation actuator 125 drives the modulation bias based upon data signal 160 received at modulation controller 140. In the illustrated embodiment, modulation region 105 includes an inhomogeneous arrangement of first material 107 and second material 108 each having different refractive indexes that disperse (e.g., scatter, refract, diffract, or otherwise alter) optical carrier wave 150 in a controlled manner to manipulate one or more optical properties (e.g., power, phase, polarization, frequency, or combinations thereof) of the optical carrier wave 150 to generate modulated wave 155. In some embodiments, the modulation bias in combination with the inhomogeneous arrangement of the modulation region 105 may cause a portion of the optical power of optical carrier wave 150 to be either directed/steered to output port 115 in an ON or HIGH logic state (process block 415) or a portion of the optical power is directed/steered away from output port 155 (e.g., towards optional port 120, reflected back to input port 110, or otherwise scattered or dispersed away from output port 115) when in a second state (e.g., LOW, OFF or other intermediary state that is not ON or HIGH) (process block 420). Of course, the logic state is determined by the modulation bias applied across modulation region 105 in response to data signal 160. Additionally, it is appreciated that a magnitude of optical power directed away from output port 115 may be dependent on a magnitude of the modulation bias. For example, when in the logic HIGH or ON state, a majority of the optical power may be directed towards the output port 115 while when in the logic LOW of OFF state, a majority of optical power may be directed away from output port 155 (e.g., towards optional port 120).

The modulation bias affects the power steering, and thus, logic state encoded on optical carrier wave 150 at output port 115 by inducing small changes in the refractive index of first material 107 and/or second material 108. Each discrete region of first material 107 and second material 108, which collectively form the pattern or inhomogeneous arrangement, represents a binary, contiguous block (homogeneous region) of either first material 107 or second material 108 having a uniform refractive index. Application of the modulation bias across the overall inhomogeneous arrangement causes small changes in the refractive index of each contiguous block of first material 107 and/or second material 108, which steers the optical power to or away from output port 115 depending upon the modulation bias. As previously mentioned, first material 107 and second material 108 may be implemented as discrete regions of two different materials, such as silicon and silicon oxide, though other material combinations may also be used. The overall pattern or inhomogeneous arrangement of first material 107 and second material 108 within modulation region 105 is determinable via inverse design using forward and adjoint simulations that seek to minimize loss function 205 presented above. Of course, other design techniques and loss functions may be implemented to arrive at a pattern or inhomogeneous arrangement of first material 107 and second material 108 according to the needs of a particular application of optical modulator 100. Additionally, it is appreciated that while process 400 is focused on modulating optical power of the optical carrier wave 150, other optical properties of the optical carrier wave 150 may also be adjusted by the modulation bias depending on the configuration of the optical modulator 100 and the loss function utilized to determine the design of the modulation region 105.

Figure 5:
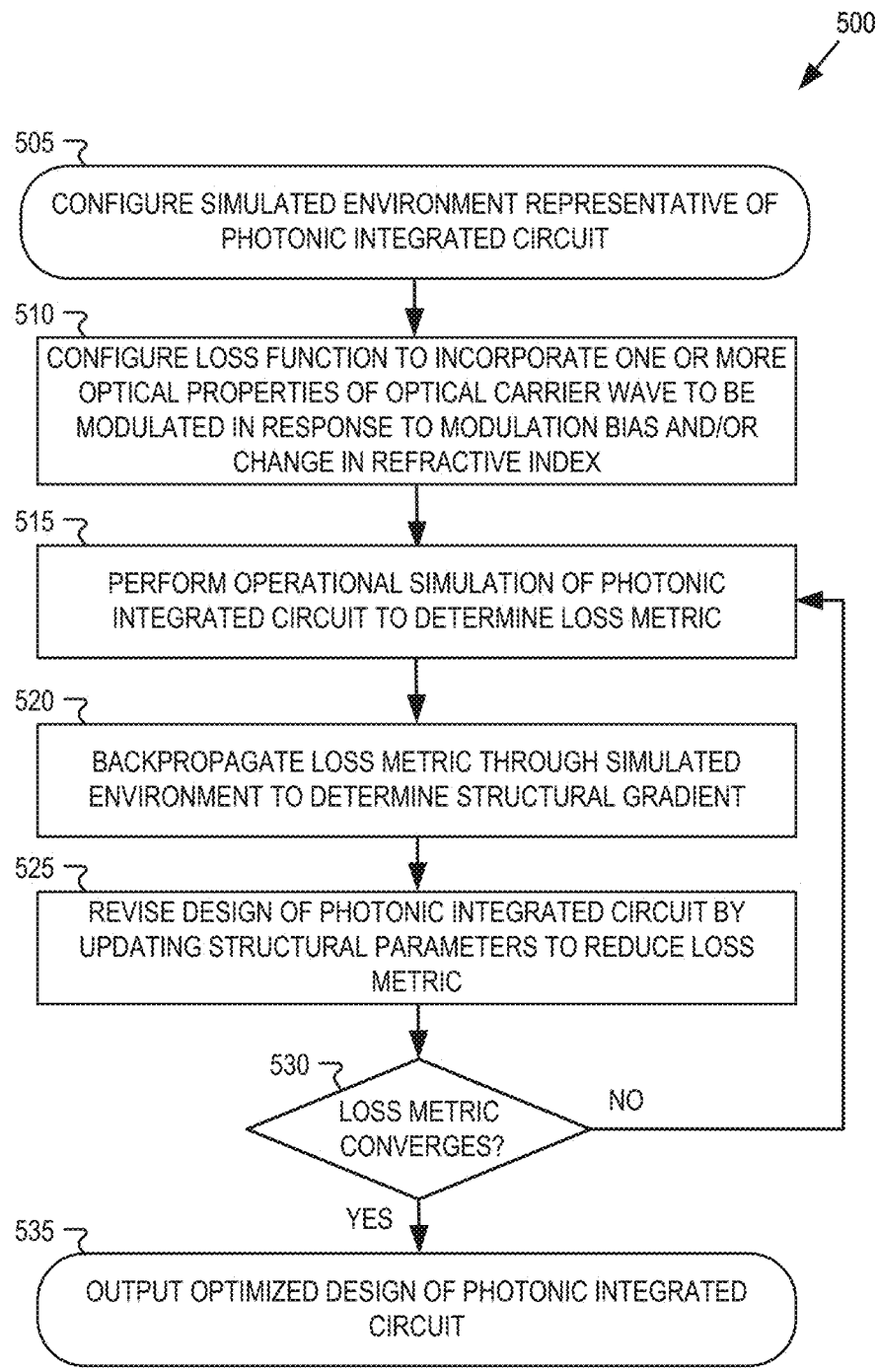
FIG. 5 illustrates a flow chart detailing an iterative process for designing an inverse designed optical modulator, in accordance with an embodiment of the disclosure.

FIG. 5 illustrates a flow chart 500 detailing an iterative process for designing an inverse designed optical modulator 100, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Block 505 shows configuring a simulation environment to be representative of a photonic integrated circuit (e.g., optical modulator 100 including modulation region 105, input port 110, output port 115, and optionally optional port 120). The simulation environment may be configured as pixels or voxels (see, e.g., FIG. 6A), in which structural parameters (e.g., refractive index), optical carrier wave properties (e.g., power, frequency, phase, polarization, and the like) and targeted performance parameters are set or otherwise configured.

Block 515 illustrates performing an operational simulation of the photonic integrated circuit to determine a loss metric (e.g., based on a loss function such as loss function 205 illustrated in FIG. 2A). The loss metric may provide information as to how the simulated optical modulator performs relative to the targeted performance metrics (see, e.g., FIG. 6B).

Block 520 shows backpropagating the loss metric (e.g., as an adjoint simulation) through the simulated environment to determine a structural gradient. It is appreciated that the structural gradient may identify how changing the structural parameters of each of the voxels or pixels included in the simulated environment may affect the loss metric or value. In this way, it can be determined which changes of the structural parameters for which voxels or pixels can be used to reduce (i.e., optimize) the loss metric or value. For example, it may not make sense to modify a structural parameter of a voxel that has limited impact on reducing the loss metric.

Block 525 illustrates revising the design of the photonic integrated circuit by updating the structural parameters to reduce the loss metric or value. This may be achieved, for example, by flipping the structural parameters for voxels with the largest structural gradient to an opposite material (e.g., flipping the material of a given voxel from first material 107 to second material 108 or vice versa). Alternatively, small changes to the structural parameters may be utilized instead of flipping. For example, a given voxel may have a material value of 0.5 which may correspond to between first material 107 and second material 108. As the iterations progress, the material value for the given value may gradually shift towards 0 or 1 indicating that the material should either be first material 107 or second material 108.

Block 530 shows a check to see if the loss metric converges or otherwise saturates based after the design of the photonic integrated circuit is revised. If the loss metric does not converge, then block 530 proceeds to block 515 and the iterative process continues. However, if the loss metric does converge or some other parametric indicates and end of the simulation (e.g., time or computational cost budget reached), then block 530 proceeds to block 535 were an output of the optimized design of the photonic integrated circuit is provided (e.g., as a schematic).

Figure 6A:
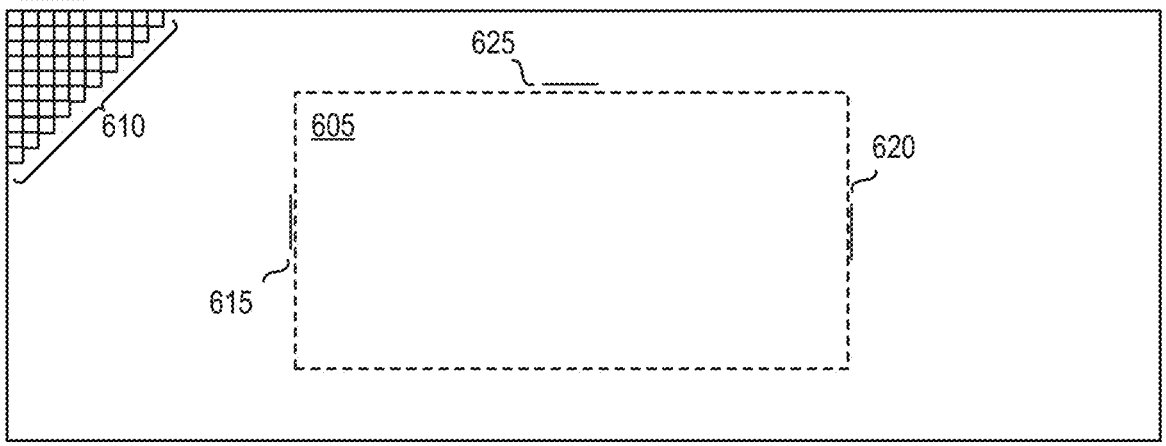
FIG. 6A illustrates a demonstrative simulated environment for simulating the operation of a physical device, in accordance with an embodiment of the disclosure.
Figure 6B:
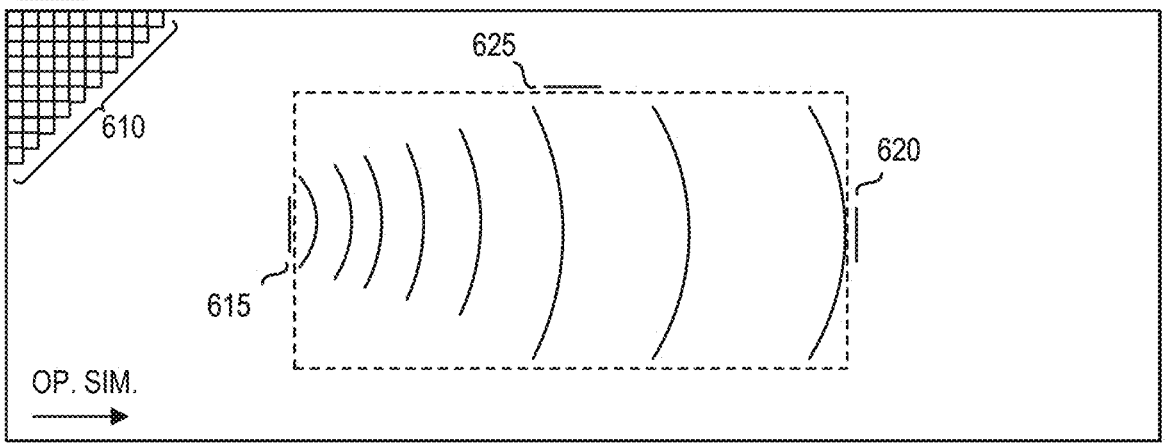
FIG. 6B illustrates an operational simulation of a physical device, in accordance with an embodiment of the disclosure.
Figure 6C:
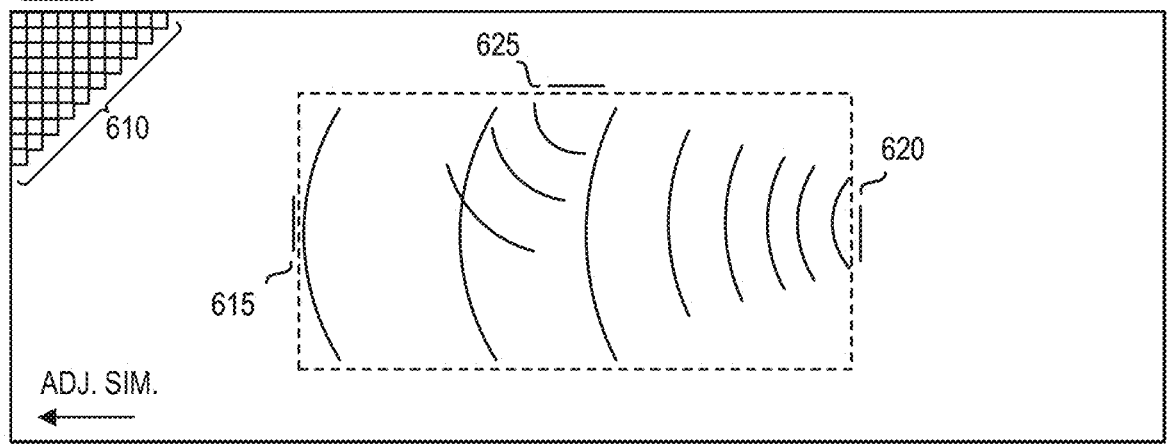
FIG. 6C illustrates an adjoint simulation (backpropagation) of a performance loss error through the simulated environment, in accordance with an embodiment of the disclosure.

FIGS. 6A-6C illustrate an initial setup, an operational simulation, and an adjoint simulation of a simulated environment 601, respectively, for optimizing structural parameters of a physical device (e.g., optical modulator 100) with a design model, in accordance with an inverse design embodiment. The simulated environment 601 and corresponding initial setup, operational simulation, adjoint simulation, and structural parameter optimization may be achieved via a physics simulator using Maxwell's equations. As illustrated in FIGS. 6A-6C, the simulated environment is represented in two-dimensions, however it is appreciated that higher dimensionality (e.g., 3-dimensional space) may also be used to describe the simulated environment 601 and the physical device. In some embodiments, the optimization of the structural parameters of the physical device illustrated in FIGS. 6A-6C may be achieved via, inter alia, simulations (e.g., time-forward and backpropagation) that utilize a finite-difference time-domain (FDTD) method to model the field responses (e.g., both electric and magnetic).

FIG. 6A illustrates an example rendering of a simulated environment 601-A describing an electromagnetic device. The simulated environment 601-A represents the simulated environment 601 at an initial time step (e.g., an initial set up) for optimizing structural parameters of the physical device. The physical device described by the simulated environment 601 may correspond to optical modulator 100 having a designable region 605 (e.g., modulation region 105) in which the structural parameters of the simulated environment may be designed, modified, or otherwise changed. The simulated environment 601 includes an excitation source 615 (e.g., a gaussian pulse, a wave, a waveguide mode response, and the like) at the location of input port 110. The electrical and magnetic fields (e.g., field response) within the simulated environment 601 (and the physical device) may change in response to the excitation source 615. The specific settings of the initial structural parameters, excitation source, performance parameters, and other metrics (i.e., initial description) for a first-principles simulation of a physical device are input before the operational simulation starts.

As illustrated, the simulated environment 601 (and subsequently the physical device) is described by a plurality of voxels 610, which represent individual elements of the two-dimensional (or three-dimensional) space of the simulated environment. Each of the voxels is illustrated as two-dimensional squares, however it is appreciated that the voxels may be represented as cubes or other shapes in three-dimensional space. It is appreciated that the specific shape and dimensionality of the plurality of voxels 610 may be adjusted depending on the simulated environment 601. It is further noted that only a portion of the plurality of voxels 610 are illustrated to avoid obscuring other aspects of the simulated environment 601. Each of the plurality of voxels 610 is associated with one or more structural parameters, a field value to describe a field response, and a source value to describe the excitation source at a specific position within the simulated environment 601. The field response, for example, may correspond to a vector describing the electric and/or magnetic field at a particular time step for each of the plurality of voxels 610. More specifically, the vector may correspond to a Yee lattice that discretizes Maxwell's equations for determining the field response. In some embodiments, the field response is based, at least in part, on the structural parameters and the excitation source 615.

FIG. 6B illustrates an example operational simulation of the simulated environment 601-B at a particular time step in which the excitation source 615 is active (e.g., generating waves originating at the excitation source 615 that propagate through the simulated environment 601). As mentioned, the physical device is an optical modulator that may be operating at the frequency of interest and having a particular waveguide mode (e.g., transverse electromagnetic mode, transverse electric mode, etc.) and the excitation source is at an input port 110. Operational simulations occur over a plurality of time steps (see FIG. 3), including the illustrated time step. When performing the operational simulation, changes to the field response (e.g., the field value) for each of the plurality of voxels 610 are updated in response to the excitation source 615 and based, at least in part, on the structural parameters of the physical device at each of the plurality of time steps. Similarly, in some embodiments the source value is updated for each of the plurality of voxels (e.g., in response to the electromagnetic waves from the excitation source 615 propagating through the simulated environment). It is appreciated that the operational simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the operational simulation, performance loss functions (e.g., Loss(T) as indicated by loss function 205 illustrated in FIG. 2A) may be computed at port 620 (e.g., corresponding to output port 115) and/or other ports (e.g., port 615 and/or 625 depending on the metric or metrics being optimized) based, at least in part, on a comparison (e.g., mean squared difference) between the field response and a desired field response at a designated time step (e.g. a final time step of the operational simulation). A performance loss value may be described in terms of a specific performance value (e.g., power). Structural parameters may be optimized for this specific performance value.

FIG. 6C illustrates an example backpropagation of performance loss error backwards within the simulated environment 601-C describing the physical device. In one embodiment, the adjoint performance simulation injects a performance loss error at output port 620 and optionally at optional port 625 as a sort of reverse excitation source for stimulating a reverse field response through voxels 610 of simulated environment 601-C. The adjoint performance simulation of the performance loss error determines an influence that changes in the structural parameters of voxels 610 have on the performance loss value (e.g., loss function 205).

Figure 7A:
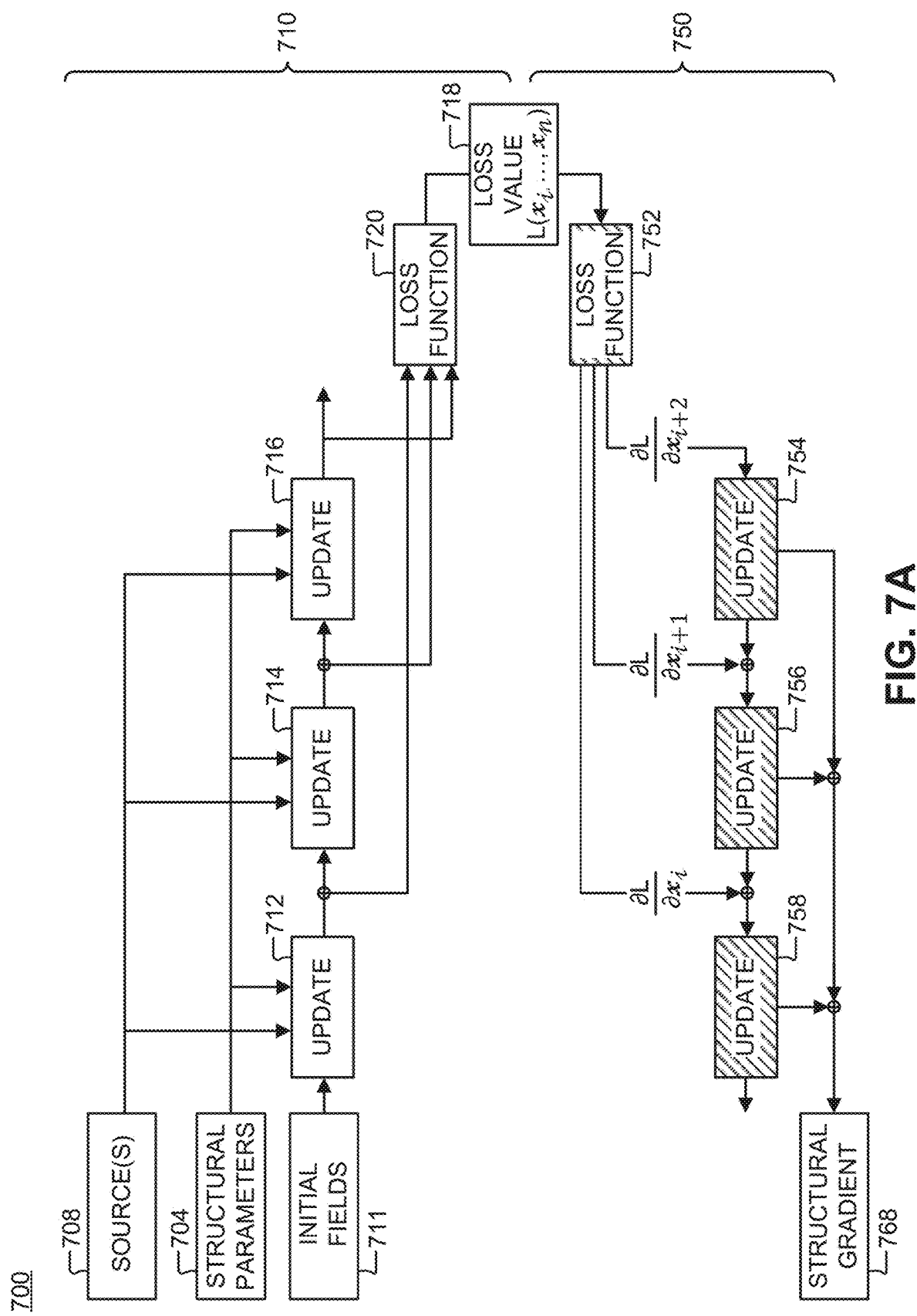
FIG. 7A is a flow chart illustrating example time steps for operational and adjoint simulations used to inverse design the optical modulator, in accordance with an embodiment of the disclosure.

FIG. 7A is a flow chart 700 illustrating example time steps for a time-forward simulation 710 and backpropagation 750 within a simulated environment, in accordance with an embodiment of the present disclosure. Flow chart 700 is one possible implementation that a design model may use to perform a forward operational simulation 710 and backpropagation 750 of a simulated environment. In the illustrated embodiment, the forward operational simulation utilizes a FDTD method to model the field response (both electric and magnetic) at a plurality of time steps in response to an excitation source. More specifically, the time-dependent Maxwell's equations (in partial differential form) are discretized to solve for field vector components (e.g., the field response of each of the plurality of voxels 610 of the simulated environment 601 in FIGS. 6A-6C) over a plurality of time steps.

As illustrated in FIG. 7A, the flow chart 700 includes update operations for a portion of operational simulation 710 and adjoint simulation 750. Operational simulation 710 occurs over a plurality of time-steps (e.g., from an initial time step to a final time step over a pre-determined or conditional number of time steps having a specified time step size) and models changes (e.g., from the initial field values 711) in electric and magnetic fields of a plurality of voxels describing the simulated environment and/or physical device that collectively correspond to the field response. More specifically, update operations (e.g., 712, 714, and 716) are iterative and based on the field response, structural parameters 704, and one or more physical stimuli sources 708. Each update operation is succeeded by another update operation, which are representative of successive steps forward in time within the plurality of time steps. For example, update operation 714 updates the field values based on the field response determined from the previous update operation 712, sources 708, and the structural parameters 704. Similarly, update operation 716 updates the field values based on the field response determined from update operation 714. In other words, at each time step of the operational simulation the field values (and thus field response) are updated based on the previous field response and structural parameters of the physical device. Once the final time step of the operational simulation 710 is performed, the loss value 718 may be determined (e.g., based on a pre-determined loss function 720 or loss function 205). The loss gradients determined from block 752 may be treated as adjoint or virtual sources (e.g., physical stimuli or excitation source originating at an output region) which are backpropagated in reverse (from the final time step incrementally through the plurality of time steps until reaching the initial time step) to determine structural gradient 768.

In the illustrated embodiment, the FDTD solve (e.g., time-forward simulation 710) and backpropagation 750 problem are described pictorially, from a high-level, using only "update" and "loss" operations as well as their corresponding gradient operations. The simulation is set up initially in which the structure parameters, the excitation source, and the initial field states of the simulated environment (and electromagnetic device) are provided. As discussed previously, the field states are updated in response to the excitation source based on the structural parameters. More specifically, the update operation is given by $\phi$, where $\mathscr{b}_i = \phi\, x_{i+1}\, z\, x_i$ for $i=1, \ldots n$. Here, $n$ corresponds to the total number of time steps (e.g., the plurality of time steps) for the time-forward simulation, $x_i$ corresponds to the field response (the field value associated with the electric and magnetic fields of each of the plurality of voxels) of the simulated environment at time step $i$, $\mathscr{b}_i$ corresponds to the excitation source(s) (the source value associated with the electric and magnetic fields for each of the plurality of voxels) of the simulated environment at time step $i$, and $z$ corresponds to the structural parameters describing the topology and/or material properties of the electromagnetic device.

It is noted that using the FDTD method, the update operation can specifically be stated as:

$$\phi(x_i, \mathscr{b}_i, z) = A(z) x_i + B(z) \mathscr{b}_i. \quad (1)$$

That is to say the FDTD update is linear with respect to the field and source terms.

Concretely, $A(z) \in \mathbb{R}^{N \times N}$ and $B(z) \in \mathbb{R}^{N \times N}$ are linear operators which depend on the structure parameters, $z$, and act on the fields, $x_i$, and the sources, $\mathscr{b}_i$, respectively. Here, it is assumed that $x_i$, $\mathscr{b}_i \in \mathbb{R}^N$ where N is the number of FDTD field components in the time-forward simulation. Additionally, the loss operation is given by L=$x_i, \ldots, x_n$), which takes as input the computed fields and produces a single, real-valued scalar (e.g., the loss value) that can be reduced and/or minimized.

In terms of revising or otherwise optimizing the structural parameters of the electromagnetic device, the relevant quantity to produce is $dL/dz$, which is used to describe the change in the loss value with respect to a change in the structural parameters of the electromagnetic device and is denoted as the "structural gradient" illustrated in FIG. 7A.

Figure 7B:
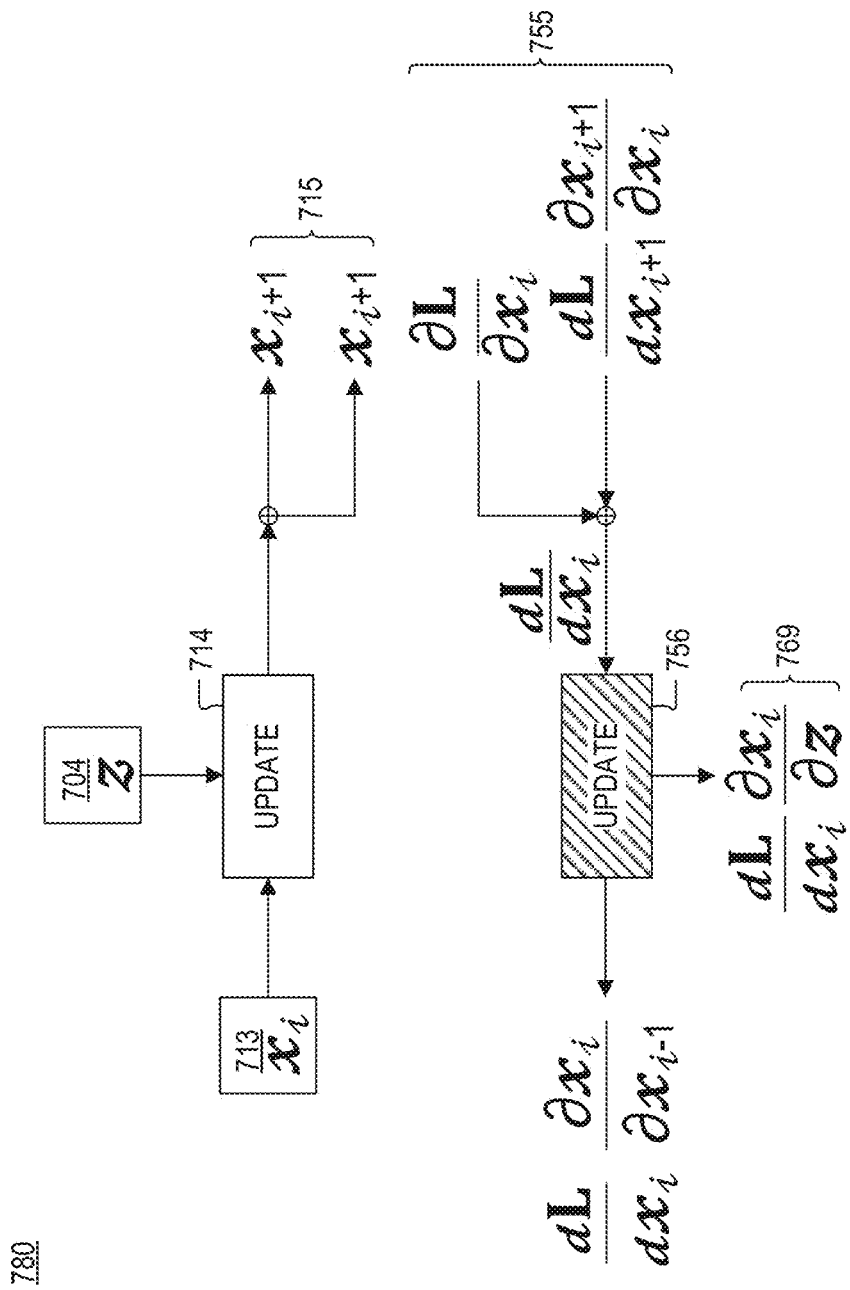
FIG. 7B is a flow chart illustrating a relationship between an operational simulation and the adjoint simulation (backpropagation), in accordance with an embodiment of the disclosure.

FIG. 7B is a chart 780 illustrating the relationship between the update operation for the operational simulation and the adjoint simulation (e.g., backpropagation), in accordance with an embodiment of the present disclosure. More specifically, FIG. 7B summarizes the operational and adjoint simulation relationships that are involved in computing the structural gradient, $dL/dz$, which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 714 of the operational simulation updates the field values 713, $x_i$, of the plurality of voxels at the $i$th time step to the next time step (i.e., $i+1$ time step), which correspond to the field values 715, $x_{i+1}$. The gradients 755 are utilized to determine $$\frac{dL}{dx_i}$$

for the backpropagation (e.g., update operation 756 backwards in time), which combined with the gradients 769 are used, at least in part, to calculate the structural gradient, $$\frac{dL}{dz} \cdot \frac{\partial L}{\partial x_i}$$

is the contribution of each field to the loss value, L. It is noted that this is the partial derivative, and therefore does not take into account the causal relationship of $x_i \to x_{i+1}$. Thus, $$\frac{\partial x_{i+1}}{\partial x_i}$$

is utilized which encompasses the $x_i \to x_{i+1}$ relationship. The loss gradient, $$\frac{dL}{dx_i}$$

may also be used to compute the structural gradient, $dL/dz$, and corresponds to the total derivative of the field with respect to loss value, L. The loss gradient, $$\frac{dL}{dx_i},$$

at a particular time step, $i$, is equal to the summation of $$\frac{\partial L}{\partial x_i} + \frac{dL}{dx_{i+1}} \frac{\partial x_{i+1}}{\partial x_i}.$$

Finally, $$\frac{\partial x_i}{\partial z},$$

which corresponds to the field gradient, is used which is the contribution to $dL/dz$ from each time/update step. $dL/dz$ is given by:

$$\frac{dL}{dz} = \sum_i \frac{dL}{dx_i} \frac{\partial x_i}{\partial z}. \quad (2)$$

For completeness, the full form of the first time in the sum, $dL/dz$, is expressed as:

$$\frac{dL}{dx_i} = \frac{\partial L}{\partial x_i} + \frac{dL}{dx_{i+1}} \frac{\partial x_{i+1}}{\partial x_i}. \quad (3)$$

Based on the definition of $\phi$ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 756), which can be expressed as:

$$\frac{dL}{dx_i} = \frac{\partial L}{\partial x_i} + \frac{dL}{dx_{i+1}} A(z), \quad (4)$$

or $$\nabla_{x_i} L = A(z)^T \nabla_{x_{i+1}} L + \frac{\partial L^T}{\partial x_i}. \quad (5)$$

The adjoint update is the backpropagation of the loss gradients from later to earlier time steps and may be referred to as a backwards solve for $$\frac{dL}{dx_i}.$$

The second term in the sum of the structural gradient $dL/dz$, is denoted as:

$$\frac{\partial x_i}{\partial z} = \frac{d\phi(x_{i-1}, b_{i-1}, z)}{dz} = \frac{dA(z)}{dz} x_{i-1} + \frac{dB(z)}{dz} b_{i-1}, \quad (6)$$

for the particular form of $\phi$ described by equation (1).

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical modulator, comprising:
   a modulation region including an inhomogeneous arrangement of two or more different materials having different refractive indexes to structure the modulation region to manipulate one or more optical properties of an optical carrier wave in response to a modulation bias;
   an input port optically coupled to the modulation region to inject the optical carrier wave into the modulation region;
   a modulation actuator disposed proximate to the modulation region and adapted to apply the modulation bias to the modulation region to generate a modulated wave, wherein the modulation bias adjusts at least one of the different refractive indexes of the inhomogeneous arrangement to provide variable control of the one or more optical properties of the optical carrier wave, wherein the modulation actuator comprises one of an electrode adapted to apply the modulation bias across the modulation region as an adjustable voltage or an electromechanical actuator adapted to apply the modulation bias across the modulation region as an adjustable pressure; and
   an output port optically coupled to the modulation region to receive the modulated wave.

2. The optical modulator of claim 1, wherein the one or more optical properties includes at least one of a frequency, a phase, a polarization, or a power of the optical carrier wave.

3. The optical modulator of claim 2, wherein the modulation actuator is adapted to impart a data signal onto the optical carrier wave to generate the modulated wave via the modulation bias.

4. The optical modulator of claim 2, wherein the inhomogeneous arrangement is further structured such that a response curve for the optical modulator of a change in the one or more optical properties of the optical carrier wave with respect to a change in the different refractive indexes due to the modulation bias is nonlinear.

5. The optical modulator of claim 1, wherein the modulated wave comprises a plurality of states based on a magnitude of the modulation bias, the plurality of states including a high state, an intermediary state, and a low state, and wherein the inhomogeneous arrangement is structured to steer, scatter, or reflect a portion of the optical carrier wave away from the output port when the modulated wave is modulated to the intermediary state or the low state.

6. The optical modulator of claim 1, wherein the two or more different materials comprise a semiconductor material and an oxide material.

7. The optical modulator of claim 1, wherein the inhomogeneous arrangement comprises a pattern of discrete regions of the two or more different materials, and wherein the pattern is selected based upon an iterative minimization of a loss function that incorporates a plurality of different states of the optical modulator, each associated with a different refractive index change.

8. The optical modulator of claim 1, wherein the input port and the output port comprise corresponding waveguide sections that physically abut the modulation region.

9. The optical modulator of claim 8, further comprising a peripheral region laterally surrounding the modulation region, wherein the peripheral region contiguously extends laterally around the modulation region but for where two or more ports abut the modulation region, and wherein the two or more ports include the input port and the output port.

10. The optical modulator of claim 9, further comprising a sink port abutting the modulation region, and wherein the two or more ports include the sink port.

11. The optical modulator of claim 9, wherein the peripheral region has a homogeneous composition, and wherein the peripheral region includes a first material included in the two or more different materials.

12. The optical modulator of claim 1, wherein the two or more different materials include a first material and a second material, wherein the inhomogeneous arrangement includes a first island of the first material laterally surrounded by the second material and a second island of the second material laterally surrounded by the first material.

13. The optical modulator of claim 1, wherein the inhomogeneous arrangement is further structured such that a response curve for the optical modulator of a change in the one or more optical properties of the optical carrier wave with respect to a change in the different refractive indexes due to the modulation bias is linear or monotonic.

14. An optical modulator, comprising:
a modulation region including an inhomogeneous arrangement of two or more different materials having different refractive indexes to structure the modulation region to manipulate one or more optical properties of an optical carrier wave in response to a modulation bias;
an input port optically coupled to the modulation region to inject the optical carrier wave into the modulation region;
a modulation actuator disposed proximate to the modulation region and adapted to apply the modulation bias to the modulation region to generate a modulated wave, wherein the modulation bias adjusts at least one of the different refractive indexes of the inhomogeneous arrangement to provide variable control of the one or more optical properties of the optical carrier wave, wherein the modulation actuator comprises one of an electrode adapted to apply the modulation bias across the modulation region as an adjustable voltage or an electromechanical actuator adapted to apply the modulation bias across the modulation region as an adjustable pressure; and
an output port optically coupled to the modulation region to receive the modulated wave, wherein the inhomogeneous arrangement is further structured such that a response curve for the optical modulator of a change in the one or more optical properties of the optical carrier wave with respect to a change in a magnitude of modulation bias or a change in the different refractive indexes due to the modulation bias is linear or monotonic.

15. A method of operation of an optical modulator, the method comprising:
receiving an optical carrier wave at a modulation region from an input port optically coupled to the modulation region to inject the optical carrier wave into the modulation region, wherein the modulation region includes an inhomogeneous arrangement of two or more different materials having different refractive indexes to structure the modulation region to manipulate one or more optical properties of the optical carrier wave in response to a modulation bias; and
modulating the modulation bias applied to the modulation region with a modulation actuator disposed proximate to the modulation region and adapted to apply the modulation bias to the modulation region to generate a modulated wave, wherein the modulation bias adjusts at least one of the different refractive indexes of the inhomogeneous arrangement to provide variable control of the one or more optical properties of the optical carrier wave, wherein the modulated wave is directed towards an output port optically coupled to the modulation region, wherein the modulation actuator comprises one of an electrode adapted to apply the modulation bias across the modulation region as an adjustable voltage or an electromechanical actuator adapted to apply the modulation bias across the modulation region as an adjustable pressure.

16. The method of claim 15, further comprising:
imparting a data signal upon the optical carrier wave to generate the modulated wave by modulating the modulation bias;
directing a majority of the optical power of the optical carrier wave to the output port when the modulated wave is modulated to a high state based upon a first logic state of the data signal; and
diverting a second majority of the optical power of the optical carrier wave away from the output port when the modulated signal is modulated to a low state based upon a second logic state of the data signal.

17. The method of claim 15, wherein the one or more optical properties includes at least one of a frequency, phase, a polarization, or a power of the optical carrier wave.

18. The method of claim 15, wherein modulating the modulation bias applied to the modulation region comprises one of:
- applying the adjustable voltage across the modulation region; or
- applying the adjustable pressure to the modulation region.

19. An optical modulator, comprising:
- a modulation region including an inhomogeneous arrangement of two or more different materials having different refractive indexes to structure the modulation region to manipulate one or more optical properties of an optical carrier wave in response to a modulation bias, wherein the one or more optical properties includes at least one of a frequency, a phase, or a polarization;
- an input port optically coupled to the modulation region to inject the optical carrier wave into the modulation region;
- a modulation actuator disposed proximate to the modulation region and adapted to apply the modulation bias to the modulation region to generate a modulated wave, wherein the modulation bias adjusts at least one of the different refractive indexes of the inhomogeneous arrangement to provide variable control of the one or more optical properties of the optical carrier wave, wherein the modulation actuator comprises one of an electrode adapted to apply the modulation bias across the modulation region as an adjustable voltage or an electromechanical actuator adapted to apply the modulation bias across the modulation region as an adjustable pressure; and
- an output port optically coupled to the modulation region to receive the modulated wave.

* * * * *